Patented July 27, 1926.

1,593,816

UNITED STATES PATENT OFFICE.

FRANZ ANDRE, OF OFFENBACH-ON-THE-MAIN, GERMANY, ASSIGNOR TO GRASSELLI DYESTUFFS CORPORATION, OF NEW YORK, N. Y.

MAKING 2-HYDROXY-NAPHTHALENE-6-CARBOXYLIC ACID.

No Drawing. Application filed November 12, 1925, Serial No. 68,704, and in Germany August 16, 1924.

My invention relates to the production of a new hydroxy-naphthalene-carboxylic acid.

The production of the 2.1- and 2.3-hydroxy-naphthalene-carboxylic acids by reacting with carbon dioxide upon the sodium salt of beta-naphthol is well known. Now I have found that by reacting with carbon dioxide upon the potassium salt of beta-naphthol at higher temperatures, advantageously over about 170° C., a new hydroxy-naphthalene-carboxylic acid is formed, to which according to scientific research the following formula:

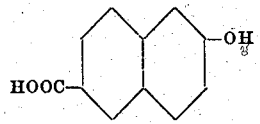

is due.

The new acid is, when dry, a white powder which can be sublimed without decomposition and is soluble in hot water and in most of the organic solvents. By the addition of iron chloride to an aqueous solution of the acid a dark brown coloration is obtained. A dilute solution of its sodium salt shows a strong blue fluorescence.

The following example illustrates the invention, the parts being by weight and all temperatures on the centigrade scale.

Example.

182 parts of the dry potassium salt of beta-naphthol are treated in an autoclave in the absence of a solvent with carbon dioxide under pressure for 8 hours at about 170–230° C. After cooling down beta-naphthol is first separated from the aqueous solution of the mass of reaction and then the 2-hydroxy-naphthalene-6-carboxylic acid is separated according to its better solubility in hot water from the 2-hydroxy-naphthalene - 3 - carboxylic acid, simultaneously formed. In this way 68 parts of 2-hydroxy-naphthalene-6-carboxylic acid are obtained.

The 2-hydroxy-naphthalene-6-carboxylic acid is readily soluble in most of the organic solvents and crystallizes from hot water and from dilute acetic acid as colorless leaflets which melts in a totally pure condition at 245° C. (not corrected).

It may be used as a intermediate for producing dyestuffs.

Now what I claim is:

1. A process of making a 2-hydroxy-naphthalene-6-carboxylic acid comprising reacting with carbon dioxide upon the potassium salt of beta-naphthol at elevated temperatures in the absence of a solvent.

2. A process of making a 2-hydroxy-naphthalene-6-carboxylic acid comprising reacting with carbon dioxide upon the potassium salt of beta-naphthol at temperatures over 170° C. in the absence of a solvent.

In testimony, that I claim the foregoing as my invention, I have signed my name, this 30th day of October 1925.

FRANZ ANDRE.